(12) United States Patent
Dagan

(10) Patent No.: US 10,751,764 B2
(45) Date of Patent: Aug. 25, 2020

(54) FILTER CLEANING SYSTEM WITH A MOVABLE PROXIMITY NOZZLE

(71) Applicant: FILTER SAFE LTD., Tefen (IL)

(72) Inventor: Etai Dagan, Kfar-Vradim (IL)

(73) Assignee: FILTER SAFE LTD., Tefen (IL)

( * ) Notice: Subject to any disclaimer, the term of this patent is extended or adjusted under 35 U.S.C. 154(b) by 0 days.

(21) Appl. No.: 16/288,188

(22) Filed: Feb. 28, 2019

(65) Prior Publication Data

US 2019/0193126 A1   Jun. 27, 2019

Related U.S. Application Data

(63) Continuation of application No. 13/508,788, filed as application No. PCT/IL2010/000935 on Nov. 11, 2010, now abandoned, which is a continuation of application No. PCT/IB2009/008061, filed on Nov. 12, 2009.

(60) Provisional application No. 61/260,856, filed on Nov. 13, 2009, provisional application No. 61/380,385, filed on Sep. 7, 2010.

(51) Int. Cl.
*B08B 5/04* (2006.01)
*B01D 29/68* (2006.01)

(52) U.S. Cl.
CPC .............. *B08B 5/04* (2013.01); *B01D 29/682* (2013.01); *B01D 29/688* (2013.01); *B01D 2201/082* (2013.01)

(58) Field of Classification Search
None
See application file for complete search history.

(56) References Cited

U.S. PATENT DOCUMENTS

| | | | | |
|---|---|---|---|---|
| 1,944,267 A | * | 1/1934 | Rathbun | B01D 46/0065 55/294 |
| 1,944,268 A | * | 1/1934 | Rathbun | B01D 46/002 55/294 |
| 1,950,466 A | * | 3/1934 | Wille | B01D 33/073 210/392 |
| 1,968,741 A | * | 7/1934 | Burrell | B01D 33/073 210/392 |
| 1,977,601 A | * | 10/1934 | Winton | F16L 55/24 210/411 |
| 1,995,648 A | * | 3/1935 | Rathbun | B01D 46/0065 55/294 |
| 1,995,649 A | * | 3/1935 | Rathbun | B01D 46/0065 55/294 |
| 2,066,479 A | * | 1/1937 | MacIsaac | B01D 29/01 210/777 |
| 2,177,967 A | * | 10/1939 | Watkins | A47J 19/02 269/21 |
| 2,275,958 A | * | 3/1942 | Hagel | B01D 35/02 210/408 |

(Continued)

FOREIGN PATENT DOCUMENTS

GB         1485989 A  *  9/1977  .......... B01D 29/682

*Primary Examiner* — Robert J Popovics
(74) *Attorney, Agent, or Firm* — Mark M. Friedman

(57) ABSTRACT

A suction nozzle assembly, comprising a tube coupled to a pressure sink at a distal side thereof, a nozzle, a resilient element which couples said nozzle to a proximal side of said tube and a deformable housing which bridges a gap between said proximal side of said tube and said nozzle. Optionally, a pressure equalizer, for example, a through aperture, is formed in said nozzle.

1 Claim, 7 Drawing Sheets

(56) References Cited

U.S. PATENT DOCUMENTS

| | | | | | |
|---|---|---|---|---|---|
| 2,765,048 | A | * | 10/1956 | Hersey, Jr. | B01D 46/04 55/294 |
| 2,835,390 | A | * | 5/1958 | King | F16L 55/24 210/411 |
| 3,017,029 | A | * | 1/1962 | Berninger | B01D 29/684 210/108 |
| 3,074,560 | A | * | 1/1963 | Kinney | B01D 33/11 210/330 |
| 3,168,467 | A | * | 2/1965 | Dreyer | F16L 55/24 210/108 |
| 3,256,995 | A | * | 6/1966 | Schmid | B01D 29/232 210/411 |
| 3,357,566 | A | * | 12/1967 | Schmid | B01D 29/54 210/333.01 |
| 3,558,171 | A | * | 1/1971 | Netsch | B66C 1/0212 294/186 |
| 3,574,509 | A | * | 4/1971 | Zentis | B01D 29/23 210/107 |
| 3,635,348 | A | * | 1/1972 | Carr | B01D 29/35 210/333.1 |
| 3,637,249 | A | * | 1/1972 | Kuhl | A01K 43/00 294/184 |
| 3,734,299 | A | * | 5/1973 | Akiyama | B01D 29/15 210/333.1 |
| 3,743,340 | A | * | 7/1973 | Williamann | B66C 1/0212 294/186 |
| 3,749,109 | A | * | 7/1973 | Rosenfeld | G01L 11/006 137/85 |
| 3,757,496 | A | * | 9/1973 | Berg | B01D 46/0013 55/293 |
| 3,834,558 | A | * | 9/1974 | Bru | B65H 3/0883 414/627 |
| 3,887,344 | A | * | 6/1975 | Smith | B01D 46/0065 55/294 |
| 3,897,604 | A | * | 8/1975 | Weimer | B23Q 11/006 15/344 |
| 3,901,502 | A | * | 8/1975 | Vits | B65H 3/0883 271/103 |
| 3,934,916 | A | * | 1/1976 | Baker | A21B 3/18 294/189 |
| 3,957,296 | A | * | 5/1976 | Langguth | B66C 1/0212 294/66.1 |
| 4,078,671 | A | * | 3/1978 | Lundstrom | B25J 15/00 294/183 |
| 4,085,051 | A | * | 4/1978 | Kaminsky | B01D 29/018 210/333.01 |
| 4,154,588 | A | * | 5/1979 | Herndon, Jr. | B01D 46/0065 55/283 |
| 4,162,219 | A | * | 7/1979 | Miropolsky | B01D 29/055 210/108 |
| 4,251,237 | A | * | 2/1981 | Smith | B01D 46/0065 55/294 |
| 4,532,036 | A | * | 7/1985 | Clifford | B01D 29/23 210/167.01 |
| 4,561,687 | A | * | 12/1985 | Bostrom | B66C 1/0212 198/689.1 |
| 4,640,503 | A | * | 2/1987 | Naumann | B65H 3/0883 271/103 |
| 4,643,828 | A | * | 2/1987 | Barzuza | B01D 29/23 210/412 |
| 4,651,396 | A | * | 3/1987 | Kerlidou | B23P 19/00 29/213.1 |
| 4,702,847 | A | * | 10/1987 | Fux | B01D 21/0012 210/798 |
| 4,749,219 | A | * | 6/1988 | Bolle, Jr. | B25J 15/0616 271/103 |
| 4,780,151 | A | * | 10/1988 | Barzuza | B01D 29/031 134/21 |
| 4,810,270 | A | * | 3/1989 | Terry | B01D 46/0046 209/274 |
| 4,818,402 | A | * | 4/1989 | Steiner | B01D 29/23 210/411 |
| 4,859,335 | A | * | 8/1989 | Whyte | B01D 29/114 210/393 |
| 4,867,879 | A | * | 9/1989 | Muller | B01D 29/035 210/392 |
| 4,875,913 | A | * | 10/1989 | Barzuza | B01D 29/031 55/294 |
| 4,898,671 | A | * | 2/1990 | Fux | B01D 21/0012 210/333.01 |
| 4,917,427 | A | * | 4/1990 | Scaglia | B65G 47/91 414/627 |
| 5,074,342 | A | * | 12/1991 | Kraehn | G03G 15/0879 141/263 |
| 5,087,365 | A | * | 2/1992 | Davis | B01D 29/118 210/415 |
| 5,152,891 | A | * | 10/1992 | Netkowicz | B01D 29/23 210/408 |
| 5,164,079 | A | * | 11/1992 | Klein | B01D 29/117 210/186 |
| 5,228,993 | A | * | 7/1993 | Drori | B01D 29/114 210/332 |
| 5,268,095 | A | * | 12/1993 | Barzuza | B01D 29/01 210/143 |
| 5,300,225 | A | * | 4/1994 | Fischer | B01D 33/073 210/391 |
| 5,344,202 | A | * | 9/1994 | Ramler | B25J 15/0616 294/188 |
| 5,370,791 | A | * | 12/1994 | Lescovich | B01D 29/118 210/107 |
| 5,447,300 | A | * | 9/1995 | Junger | B65H 3/0883 271/107 |
| 5,464,542 | A | * | 11/1995 | Grienberger | B01D 29/15 210/784 |
| 5,549,825 | A | * | 8/1996 | Barzuza | B01D 29/232 210/411 |
| 5,587,074 | A | * | 12/1996 | Lynch | B01D 29/23 210/411 |
| 5,632,903 | A | * | 5/1997 | Caracciolo, Jr. | B01D 29/117 210/333.01 |
| 5,728,297 | A | * | 3/1998 | Koller | B01D 29/23 210/407 |
| 5,779,901 | A | * | 7/1998 | Mosca | B01D 29/117 210/411 |
| 5,824,229 | A | * | 10/1998 | Larkey | B01D 29/117 210/741 |
| 5,855,794 | A | * | 1/1999 | Caracciolo, Jr. | B01D 29/117 210/107 |
| 6,267,879 | B1 | * | 7/2001 | Gil | B01D 29/114 210/107 |
| 6,337,013 | B1 | * | 1/2002 | Koopmans | B01D 29/23 210/232 |
| 6,360,896 | B1 | * | 3/2002 | Schildmann | B01D 29/014 210/411 |
| 6,497,815 | B1 | * | 12/2002 | Koller | B01D 29/014 210/130 |
| 6,612,633 | B1 | * | 9/2003 | Tell | B65G 47/91 294/186 |
| 7,055,699 | B2 | * | 6/2006 | Takatsuka | B01D 29/15 210/107 |
| 7,083,208 | B2 | * | 8/2006 | Ilich | A01K 45/007 294/64.2 |
| 7,083,735 | B2 | * | 8/2006 | Laing | B01D 29/114 210/791 |
| 7,207,609 | B2 | * | 4/2007 | Ilich | A01K 45/007 294/64.2 |
| 7,258,238 | B2 | * | 8/2007 | Raghupathy | B01D 29/35 210/411 |
| 7,297,265 | B1 | * | 11/2007 | Booth | B01D 29/23 210/304 |
| 7,678,284 | B2 | * | 3/2010 | Ricketts | B01D 29/05 210/791 |
| 8,028,841 | B2 | * | 10/2011 | Olson | B01D 29/117 210/411 |
| 8,251,415 | B2 | * | 8/2012 | Lomerson, Jr. | B25J 15/0616 294/2 |
| 8,496,117 | B2 | * | 7/2013 | Leath, III | B01D 33/11 210/373 |

(56) References Cited

U.S. PATENT DOCUMENTS

| | | | | |
|---|---|---|---|---|
| 8,524,075 B1* | 9/2013 | Quintel | B01D 29/232 | 210/108 |
| 8,679,335 B1* | 3/2014 | Dufort | B01D 35/02 | 134/104.4 |
| 8,684,434 B2* | 4/2014 | Lomerson, Jr. | B25J 15/0633 | 294/186 |
| 8,821,720 B2* | 9/2014 | Lee | B01D 29/117 | 210/107 |
| 8,852,441 B2* | 10/2014 | Mueller | C02F 1/325 | 210/748.1 |
| 8,852,445 B2* | 10/2014 | Xia | B01D 29/39 | 210/333.01 |
| 8,864,200 B2* | 10/2014 | Lomerson, Jr. | B25J 15/0633 | 294/186 |
| 8,980,103 B2* | 3/2015 | Lee | B63J 4/002 | 210/411 |
| 9,211,489 B2* | 12/2015 | Riggers | B01D 29/6476 | |
| 9,310,280 B2* | 4/2016 | Reynolds | G01F 1/46 | |
| 9,314,718 B2* | 4/2016 | Mauda | B01D 29/68 | |
| 9,382,134 B2* | 7/2016 | Inoue | B63J 4/002 | |
| 9,511,310 B2* | 12/2016 | Ueyama | B01D 29/21 | |
| 9,545,588 B2* | 1/2017 | Lee | B01D 29/117 | |
| 9,550,557 B2* | 1/2017 | Lee | B01D 29/684 | |
| 9,561,454 B2* | 2/2017 | Browning | B01D 29/035 | |
| 9,561,455 B2* | 2/2017 | Fraser | B01D 29/114 | |
| 9,616,363 B2* | 4/2017 | Osman Oguz | B01D 29/58 | |
| 9,669,335 B2* | 6/2017 | Takahashi | B01D 46/002 | |
| 9,669,554 B2* | 6/2017 | Eisele | B65G 47/91 | |
| 9,688,376 B2* | 6/2017 | Ueyama | B63J 4/002 | |
| 9,908,793 B2* | 3/2018 | Inoue | C02F 1/325 | |
| 9,968,872 B2* | 5/2018 | Carayon | B01D 33/801 | |
| 10,052,574 B2* | 8/2018 | Takahashi | B01D 29/6484 | |
| 10,058,806 B2* | 8/2018 | Tange | C02F 1/004 | |
| 10,195,549 B1* | 2/2019 | Grabbe | B01D 29/68 | |
| 10,233,092 B2* | 3/2019 | Tange | C02F 1/004 | |
| 10,245,531 B2* | 4/2019 | Steiner | B01D 29/23 | |
| 10,583,379 B2* | 3/2020 | Cote | B01D 33/503 | |
| 2007/0199885 A1* | 8/2007 | Shmuel | B01D 29/114 | 210/427 |
| 2008/0047885 A1* | 2/2008 | Shiekelmacher | B01D 29/23 | 210/107 |
| 2008/0190826 A1* | 8/2008 | Miner | C02F 1/004 | 210/98 |
| 2011/0254298 A1* | 10/2011 | Lomerson, Jr. | B25J 15/0616 | 294/65 |
| 2011/0303591 A1* | 12/2011 | Lee | B01D 29/117 | 210/106 |
| 2012/0111788 A1* | 5/2012 | Leath, III | B01D 33/11 | 210/409 |
| 2012/0223028 A1* | 9/2012 | Dagan | B08B 5/04 | 210/791 |
| 2012/0312757 A1* | 12/2012 | Ueyama | B01D 29/21 | 210/780 |
| 2013/0168330 A1* | 7/2013 | Strasser | B01D 29/68 | 210/771 |
| 2013/0306546 A1* | 11/2013 | Cartarius | B01D 29/117 | 210/411 |
| 2013/0319953 A1* | 12/2013 | Ozawa | B01D 29/21 | 210/747.6 |
| 2014/0097145 A1* | 4/2014 | Browning | B01D 29/035 | 210/780 |
| 2014/0116965 A1* | 5/2014 | Cote | B01D 33/11 | 210/784 |
| 2014/0231320 A1* | 8/2014 | Lee | B01D 29/52 | 210/108 |
| 2014/0238911 A1* | 8/2014 | Lee | B01D 29/682 | 210/108 |
| 2014/0246378 A1* | 9/2014 | Lee | B01D 29/117 | 210/741 |
| 2015/0053628 A1* | 2/2015 | Dale | B08B 5/04 | 210/798 |
| 2015/0129483 A1* | 5/2015 | Mauda | B01D 29/68 | 210/411 |
| 2015/0210564 A1* | 7/2015 | Inoue | C02F 1/325 | 250/438 |
| 2016/0236122 A1* | 8/2016 | Tange | B63B 13/00 | |
| 2017/0014736 A1* | 1/2017 | Osman Oguz | B01D 29/58 | |
| 2017/0349450 A1* | 12/2017 | Tange | C02F 1/004 | |
| 2018/0056214 A1* | 3/2018 | Cote | B01D 33/067 | |
| 2019/0193126 A1* | 6/2019 | Dagan | B08B 5/04 | |
| 2019/0381430 A1* | 12/2019 | Lingen | B01D 29/23 | |
| 2019/0388808 A1* | 12/2019 | Takahashi | B01D 33/073 | |

* cited by examiner

FILTER CLEANING SYSTEM WITH A MOVABLE PROXIMITY NOZZLE

RELATED APPLICATIONS

This application is a Continuation of U.S. application Ser. No. 13/508,788

FIELD AND BACKGROUND OF THE INVENTION

The present invention, in some embodiments thereof, relates to self cleaning filtration systems and, more particularly, but not exclusively, to a nozzle assembly used for cleaning a filtration screen.

Over 80% of global trade volume is still transported by ship. Ballast water is required to compensate when there is an absence of cargo. A major environmental threat currently exists by the use of ballast water. Indigenous microorganisms, sediment, plants and animal life are drawn into the ballast water, shipped to another part of the world and then discharged into an alien environment. In response, the International Marine Organization has introduced the mandatory specification of automatic filters within ballast water treatment systems on all newly built and retrofitted vessels.

The cleaning of a filtration screen used for the filtration of water and sea water in particular is difficult. The lower the size of the holes in the filter (usually under 100 microns) the more difficult it is to remove the trapped suspended solids that have accumulated and imbedded on the filtration screen. Organic matter tends to stick to the filtration screen making removal especially difficult.

Some examples of attempts to increase the efficiency of cleaning a filtration screen include:

Nozzles that are fixed on the suction pipe collector at a preset distance from the filtration screen without an ability to move closer and further from the filtration screen.

Patent application WO 2006/008729 discloses "The nozzle 34 comprises a nozzle pipe 44 and nozzle cap 46 with an annular rim 47. The tubular basis 40 is closed by a cover 48. The nozzle pipe 44 is supported in the tubular basis 50 by an annular guide 50 and an opening in the cover 48 so as to form an axially movable telescope joint. The cylinder spring 42 urges the nozzle pipe 44 axially towards the inlet surface of the mesh 20." Furthermore, "the telescope joint and the spring 42 are protected from the harmful particles by two tight sealing rings 52 and 54".

Patent application EP 1785178 discloses a "nozzle 230 moves along guide 210, or at least along upper portion 212, while extending towards the inner part of fine filter 40." Further, "During the backwash operation fluid flows through the final filtering chamber 30 toward the space defined within nozzle 240. Due to this flow the outer edge to 242 of nozzle 240 is pushed away from the fine filter 40 while the inner edge is pushed towards the fine filter. Because the area of the inner edge 244 is larger than the area of the outer edge 242 of nozzle 240 the overall effect of the fluid flow is to push nozzle 240 towards the inner face of fine filter 40."

SUMMARY OF THE INVENTION

According to an aspect of some embodiments of the present invention there is provided a suction nozzle assembly, comprising:
a tube coupled to a pressure sink at a distal side thereof;
a nozzle;
a resilient element which couples said nozzle to a proximal side of said tube; and
a deformable housing which bridges a gap between said proximal side of said tube and said nozzle. Optionally, said housing comprises an elastic tube. Optionally or alternatively, said housing comprises a bellows, which bellows also acts as said resilient element. Optionally, said bellows is formed of stainless steel.

In an exemplary embodiment of the invention, said housing is deformable to extend in a direction perpendicular to a flow in said nozzle.

In an exemplary embodiment of the invention, the assembly comprises at least one pressure-equalizing aperture formed in one or both of said nozzle and said housing and providing fluid communication between said gap and an outside of said nozzle assembly. Optionally, at least one of said at least one pressure equalizing aperture is formed in said nozzle. Optionally or alternatively, at least one of said at least one pressure equalizing aperture is formed in said housing. Optionally or alternatively, at least one of said at least one pressure equalizing aperture is located inside said nozzle assembly and adjacent a section of said nozzle having a projection on a plane perpendicular to a flow in said nozzle. Optionally or alternatively, at least one of said at least one pressure equalizing aperture is configured to prevent and/or reduce deformation of said housing by said pressure sink. Optionally or alternatively, at least one of said at least one pressure equalizing aperture is configured to prevent and/or reduce pressure reduction in said housing by said pressure sink. Optionally or alternatively, at least one of said at least one pressure equalizing aperture is configured to prevent and/or reduce retraction of said nozzle by said pressure sink. Optionally or to alternatively, said at least one pressure equalizing aperture reduces a pressure difference between said gap and said outside by at least 50%. Optionally or alternatively, said at least one pressure equalizing aperture have, in total, a total cross-section of between 60 mm.sup.2 and 800 mm.sup.2 Optionally or alternatively, said nozzle is configured to have velocity flow through a cross section thereof, of at least 8 meters per second. Optionally or alternatively, said at least one pressure equalizing aperture comprises a plurality of apertures arranged at substantially equally circumferentially spaced apart locations on said nozzle.

In an exemplary embodiment of the invention, said nozzle is a low friction nozzle.

In an exemplary embodiment of the invention, said gap includes an axial gap. Optionally or alternatively, said gap includes a radial gap.

There is also provided in accordance with some embodiments of the invention, a filtering system comprising:
a filter layer;
an assembly as described herein; and
a movement actuator configured to move said nozzle assembly over at least 50% of a surface of said layer, wherein said assembly is configured to maintain a gap of 5 mm or less from said filter over all of said movement of said at least 50% of surface. Optionally, said resilient element advances said nozzle away from said tube with a force of between 100 grams and 800 grams. Optionally, said force is maintained over a range of pressure differentials between an inside of said tube and an outside of said tube of at least 2 bar.

In an exemplary embodiment of the invention, the assembly comprises at least one pressure sink coupled to said gap and configured to equalize pressure between said gap and an outside of said nozzle assembly.

In an exemplary embodiment of the invention, said pressure sink comprises an outlet to the environment.

There is provided in accordance with some embodiments of the invention, a method of approximating a nozzle coupled, with a gap to a pressure sink, to a filter, comprising:

resiliently urging said nozzle towards said filter; and allowing sufficient fluid flow between an outside of said nozzle and said gap, so as to reduce a retraction of said nozzle by said pressure sink. Optionally, said resiliently urging comprises resiliently urging using a bellows which also bridges said gap. Optionally or alternatively, said allowing sufficient flow comprises allowing sufficient flow through one or more pressure-equalizing channels in said nozzle.

There is provided in accordance with some embodiments of the invention, a suction nozzle assembly, comprising:

a tube coupled to a pressure sink at a proximal side thereof;

a nozzle; and a deformable housing which bridges a gap between said distal side of said tube and said nozzle and which couples said nozzle to a distal side of said tube and which allows tilting motion of said nozzle relative to said tube.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
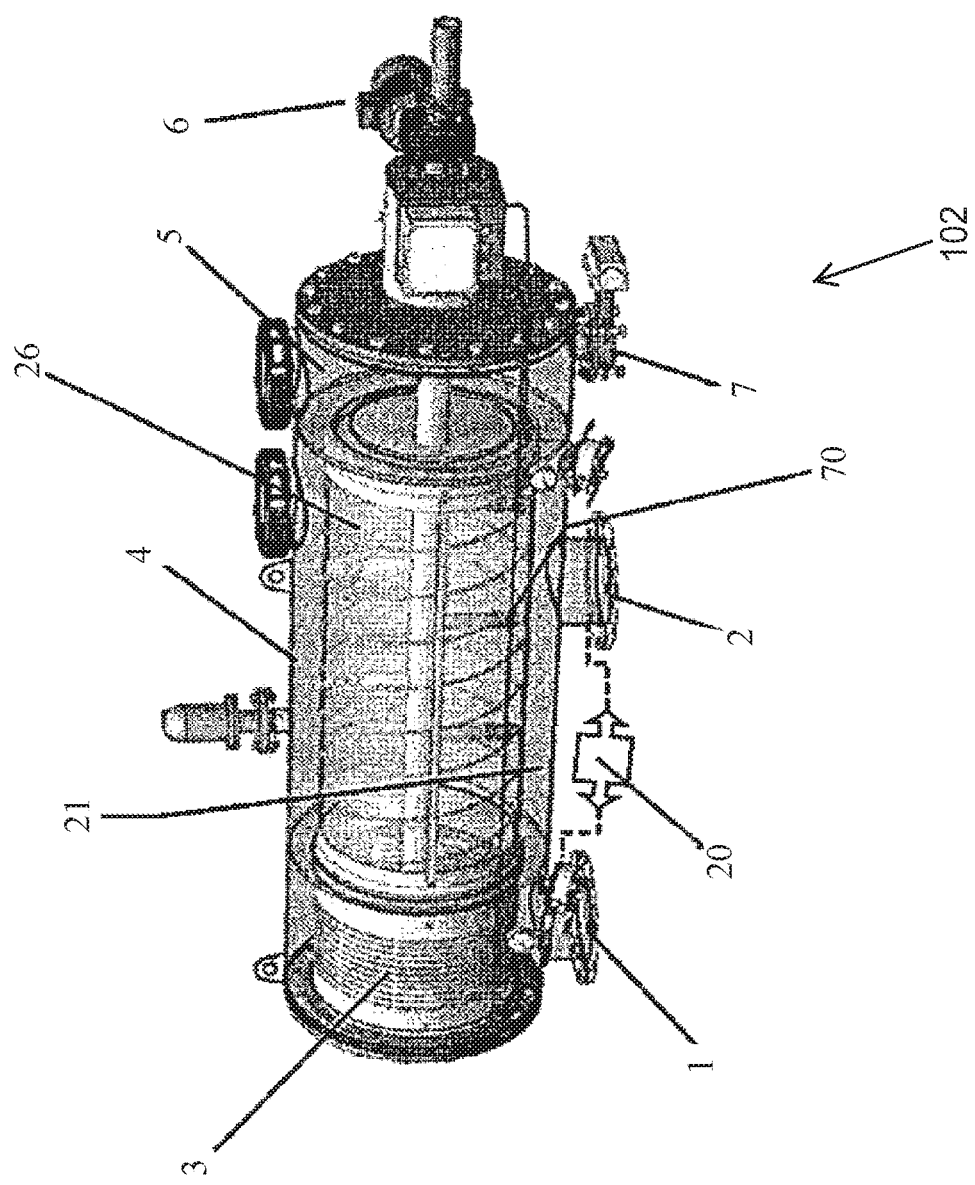
FIG. 1 is a view of a filtration system, in accordance with an embodiment of the invention.

DESCRIPTION OF SPECIFIC EMBODIMENTS
OF THE INVENTION

The present invention, in some embodiments thereof, relates to self cleaning filtration systems and, more particularly, but not exclusively, to a nozzle assembly used for cleaning a filtration screen.

An aspect of some embodiments of the invention relates to approximating a nozzle connected to a pressure sink to a filtration screen in the presence of flow from the screen and through the nozzle. In an exemplary embodiment of the invention, the nozzle is pressed against the screen with a low force. Optionally, the force is provided by a resilient element which is either sealed and/or enclosed. Optionally, the enclosure and/or element deform, rather than and/or in addition to sliding, as the nozzle moves relative to the pressure sink. Optionally, the movement is axial. Optionally or alternatively, the movement includes tipping.

In an exemplary embodiment of the invention, retraction of the nozzle, directly and/or indirectly is reduced and/or prevented by equalizing a pressure differential otherwise associated with the nozzle. In an exemplary embodiment of the invention, a pressure differential between the enclosure and the volume outside the nozzle is reduced and/or prevented. Optionally, such reduction reduces axial contraction of said enclosure to (and possible retraction of the nozzle thereby). Optionally or alternatively, a pressure differential between axially front and back parts of the nozzle are reduced and/or prevented. Optionally, such a reduction prevents direct retraction of the nozzle. Optionally or alternatively, one or more gaps in the nozzle assembly which convey pressure differentials from the pressure sink to other parts of the assembly are short circuited using a pressure-equalizing element.

In an exemplary embodiment of the invention, pressure equalizing is provided by one or more apertures formed in the nozzle and/or enclosure.

In an exemplary embodiment of the invention, the nozzle is coupled to a pressure sink with a gap formed therebetween and protected by the enclosure. In an exemplary embodiment of the invention, the gap allows free motion of the nozzle, possibly even in the presence of sediment and/or other encrustations and/or interference. Optionally, the enclosure reduces some types of encrustations and/or debris from clogging and/or otherwise interfering with the nozzle assembly mechanism.

In an exemplary embodiment of the invention, the gap between any moving parts, for example, sliding parts and/or parts that move apart, is at least 0.5 mm, at least 1 mm, at least 2 mm or other, smaller, intermediate or larger gaps.

In an exemplary embodiment of the invention, the pressure equalizer allows the applied force to remain substantially the same, even if the strength of the suction force created by the pressure sink changes. Optionally, by using a low force over a range of distances, such as 1-5 mm, for example, 2-3 mm, the nozzle can match to various irregularities in the filtering screen geometry without causing deformation thereof.

An aspect of some embodiments of the invention relates to a nozzle assembly including an ability to tip a nozzle to better match a surface plane of a filtering screen. In an exemplary embodiment of the invention, the nozzle is attached to a pressure sink, such as a tube, by a tipping sleeve, optionally a deformable sleeve. Optionally or alternatively, the nozzle is resiliently urged away form said sink and/or towards said screen by a resilient element, such as a spring.

An aspect of some embodiments of the invention relates to equalizing the pressure on both sides of the bellows, allowing the bellows' force to push the nozzle towards the screen.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Overview of Filtration Systems

For purposes of better understanding some embodiments of the present invention, as illustrated in FIGS. 2-7 of the drawings, reference is first made to an example of a filtration system 102, as illustrated in FIG. 1, where exemplary embodiments of the invention may be used.

Raw water (e.g., sea water) enters through a raw water inlet 1 to an inlet chamber 3. The water is then directed to a filtration chamber 4 where it then passes through a filtration screen 26. Filtration screen 26 dislodges suspended particles from the water, which are then retained. The filtered water flows out through a filtered water outlet 2 where it continues downstream to the rest of the system.

An accumulation of solids on filtration screen 26 creates a "cake" of dirt, which slowly reduces the differential pressure across it. In an exemplary embodiment of the invention, local reverse flow across filtration screen 26 is used to clean away this cake.

In an exemplary embodiment of the invention, reverse flow is applied based on a determination of reduction in filtration efficacy. Optionally or alternatively, reverse flow is applied continuously and/or periodically. In one embodiment, a pressure differential switch 20 monitors the pressure between raw water inlet 1 and filtered water outlet 2. When this pressure drops below a predetermined threshold, a signal is sent to the system controller in order to activate a cleaning cycle. As noted, cleaning of filtration screen 26 may also occur during regularly scheduled intervals. Optionally or alternatively, the cleaning cycle may also be manually activated by an operator.

In an exemplary embodiment of the invention, a cleaning cycle includes applying reverse flow at one or more sections of filtration screen 26. Optionally, a cleaning cycle includes traversing the entire filtration screen 26, or at least 30%, 50%, 70% or intermediate percentages thereof.

In an exemplary embodiment of the invention, traversing includes motorized movement of a cleaning head 70 over filtration screen 26. Other sources of movement can be provided as well, for example, manual movement. While, in an exemplary embodiment of the invention the cleaning head 70 is moved, optionally, the filtration screen 26 is moved as well and/or instead.

In one example, a cleaning cycle begins when the system controller activates a driving means such as a gear motor 6, which in turn rotates a suction pipe collector 21 and an attached cleaning heads 70. Motion can occur in a helical pattern so as to eventually cover over at least 50% of the surface area of filtration screen 26. At the same time, a flush valve 7 opens to a low pressure sink such as the atmosphere and/or to another part of the system. The pressure differential causes a reverse flow of filtered water through filtration screen 26. The reverse flow of filtered water removes the trapped solids from filtration screen 26 into cleaning heads 70 and through suction pipe collector 21, which optionally drains through a flushing chamber 5 and/or through flush valve 7.

In an exemplary embodiment of the invention, the time duration required for the cleaning process is about 30 seconds. Optionally, the time can be automatically increased if the cleaning was not performed to a satisfactory level as determined, for example, by pressure differential switch 20.

In an exemplary embodiment of the invention, the method of cleaning requires use of small amounts of water. Optionally, the method of cleaning may be a continuous flush mode, wherein cleaning of heavy buildup on filtration screen 26 continues for an extended period of time until filtration screen 26 is sufficiently cleaned and/or whenever the filter is in operation.

In many embodiments of the invention, more efficient cleaning occurs when the flow is constrained to be across the clogged filtration screen 26. Such a situation may occur when cleaning heads 70 are touching filtration screen 26 during the cleaning cycle. If cleaning heads 70 are located some distance away from filtration screen 26, there will be a flow of water from between the filtration screen 26 and the cleaning head 70, which will reduce the volume of water and/or the suction force that is available to clean filtration screen 26.

The size of filtration chamber 4 can depend on the size of filtration screen 26 and/or is optionally adjusted to reflect flow rates. Exemplary, non-limiting flow rates are about 1 m.sup.3/hour, about 10 m.sup.3/hour, about 100 m.sup.3/hour, about 1000 m.sup.3/hours, about 5000 m.sup.3/hour, about 8000 m.sup.3/hour, about 10 000 m.sup.3/hour, or other, smaller, intermediate or larger flow rates.

In an exemplary embodiment of the invention, filtration screen 26 consists of a four layer stainless steel woven mesh sintered together. The structure of filtration screen 26 is optionally selected to be able to withstand potential high pressure differentials, for example, at least 5 bar, at least 10 bar, at least 15 bar or intermediate numbers. The weaved wire design of filtration screen 26, in some embodiments thereof, can retain a higher rate of suspended solids, but it can also be more difficult to clean.

Potential Advantages

It should be noted that some embodiments of the invention support relative movement between cleaning head 70 and filtration screen 26, which may accommodate distortion of the screen by a pressure differential.

In some embodiments, the power requirements of filtration system 102 are reduced. Optionally the power requirements are reduced due to an increase in the amount of debris removed from the filtration screen 26 per cleaning cycle, thereby requiring less frequent cleaning cycles. Optionally, the system has a low operating energy requirement of about 0.1 HP, about 0.5 HP, about 1 HP, or other smaller, intermediate or larger energy requirements.

In some embodiments, the use of a resilient force to advance a cleaning head nozzle towards the screen, allows the cleaning head to operate in any orientation.

In some embodiments, filtration system 102 is installed horizontally, and/or at other orientations. Optionally, the system supports installation at a range of angles and/or a variety of orientations, for example, both horizontally and/or vertically.

As used herein, the terms proximal and/or proximally refer to positions and/or movement respectively towards filtration screen 26. As used herein, the terms distal and/or distally refer to positions and/or movement respectively away from filtration screen 26.

Some embodiments of the invention have potential advantages over the use of a spring inside a sealed chamber to push a nozzle on a telescopic joint towards filtration screen 26. During a cleaning cycle the operative pressure across filtration screen 26 constantly changes, for example, as may occur if one area of the filtration screen has a small amount of debris and/or another has a thick layer of debris. A spring needs to overcome the highest possible operative pressure in order to be able to push the nozzle against the filtration screen at all times. The practical result is that the nozzle presses against filtration screen 26 with a higher force than would be required to simply touch filtration screen 26. The excess force causes frictional wear and/or tear.

Some embodiments of the invention also have potential advantages by selecting not to use a sealed chamber in order to protect the telescopic joint and/or the spring from sticking with dirt. Thus, the high wear and/or tear due to friction created by the moving telescopic joint and/or spring on the seals may be reduced and/or avoided. Optionally or alternatively, by not having sliding seals, buildup at the seals which would otherwise interfere with correct operation, may be avoided.

The described embodiments of the invention can potentially require less expensive and/or less frequent maintenance and/or repairs.

EXEMPLARY EMBODIMENT

Figure 2:
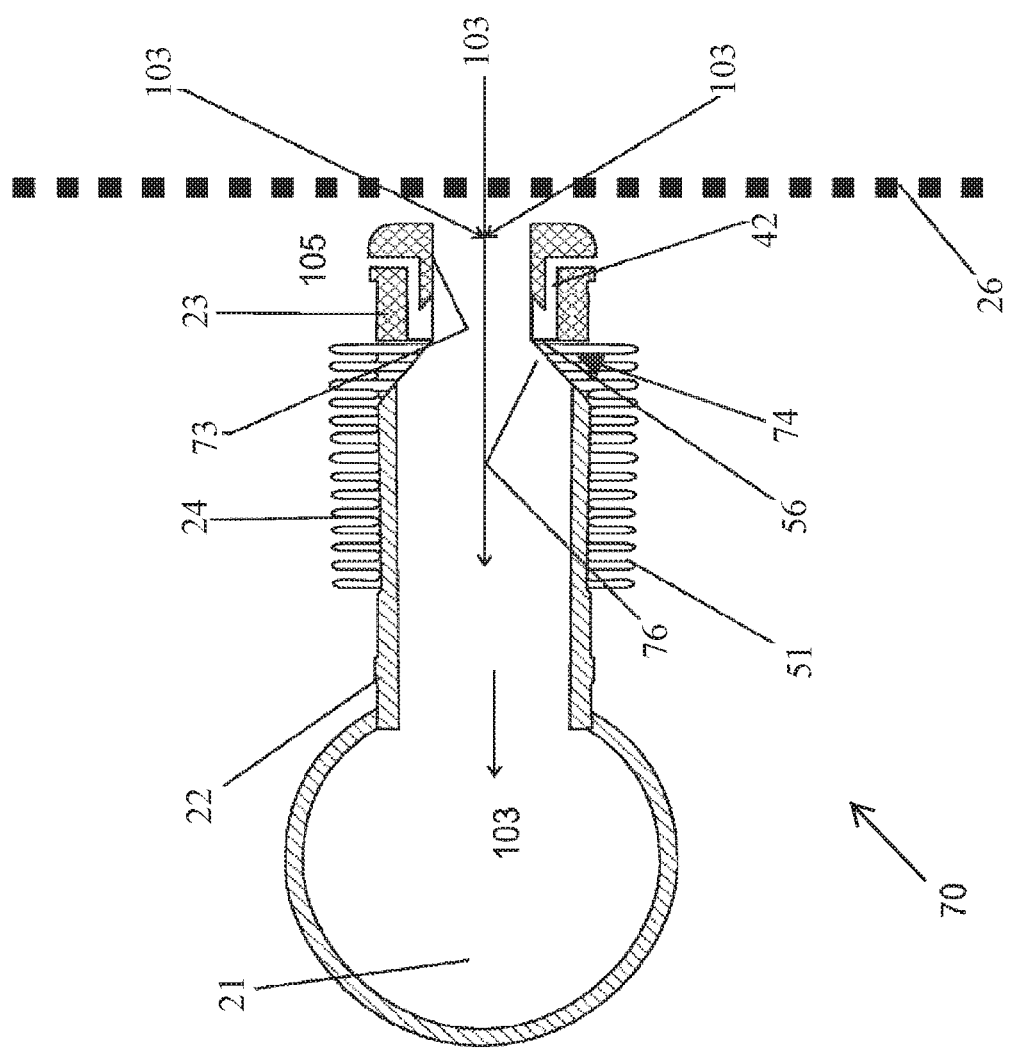
FIG. 2 is a cross sectional view of a cleaning head, in accordance with an embodiment of the invention.

Referring now to the drawings, FIG. 2 illustrates an embodiment of a cleaning head 70 that can approximate a nozzle to the surface of filtration screen 26 such that it touches it with a low frictional force, providing a spring tension force of about 100 grams per mm, about 150 grams per mm, about 200 grams per mm, or other smaller, intermediate or larger spring tension forces. For example, the contact force can be between 10 and 500 grams, for example, between 50 and 300 grams or between 100 and 200 grams. As shown, a proximity nozzle 23 is coupled to a pipe 22 by a bellows 24. Optionally, bellows 24 includes a plurality of corrugations 51 which allow it to expand and/or contract. In an exemplary embodiment of the invention, bellows 24 is configured (e.g., length, position and/or resiliency) to urge proximity nozzle 23 towards filtration screen 26. If reverse movement of proximity nozzle 23 is needed, bellows 23 optionally accommodates such motion.

In operation, (e.g., during a cleaning cycle) suction pipe collector 21 is optionally connected to a pressure sink, which forms a suction force 103 inside pipe 21 and/or in an inner side of proximity nozzle 73. A potential problem of such suction force 103 is it can retract proximity nozzle 23, for example, due to the proximal side of proximity nozzle 23 experiencing a higher pressure than the distal side thereof. Optionally or alternatively, suction force 103 can reduce the pressure inside bellows 24, causing contraction thereof and/or possible retraction of proximity nozzle 23. It is noted that some embodiments of the invention include generous gaps, to prevent or avoid sizing-up, which can convey such suction force to various parts of the cleaning head. It is also noted that the suction force, offset of the cleaning head from the filtration screen and/or degree of clogging, as well as resistance of nozzle to retraction can change over time (within and/or between cycles) and/or between systems.

In an exemplary embodiment of the invention, one or more pressure equalizers 42 are used to reduce and/or neutralize a retraction effect of suction force 103 on proximity nozzle 23 and/or bellows 24. Optionally pressure equalization takes place by a fluid communication between a gap 74 behind proximity nozzle 23 and/or an interior of bellows 56 and/or an outside 105. Outside 105 can be close to the surface of filtration screen 26. Optionally neutralization of suction force 103 on proximity nozzle 23 prevents the distal motion of proximity nozzle 23. Optionally neutralization of suction force 103 on bellows 24 allows bellows 24 to maintain an expanded shape (or re-expand if equalization is adjusted) and/or push proximity nozzle 23 towards filtration screen 26. Optionally re-expansion is achieved by a spring-like action of bellows 24.

Optionally bellows 24 may be adjusted proximally or distally relative to its initial position, for example −3 mm, −2 mm, −1 mm, 0 mm, +1 mm, +3 mm, +5 mm or other smaller, intermediate or larger distances relative to initial position, to push proximity nozzle 23 all the way to contact filtration screen 26, but with a low force so there is low friction.

Optionally bellows 24 may be adjusted manually and/or automatically. Optionally bellows 24 may be adjusted using an adjusting screw, an adjusting washer, and/or an adjusting nut and/or other pipe and/or tension adjusting means, for example as known in the art. Optionally the length of pipe 22 may be adjusted as well and/or instead.

Optionally pipe 22 can have a narrowing 76.

In an exemplary embodiment of the invention, pressure equalizer 42 is a channel, optionally valved. Optionally or alternatively, equalizer 42 is an active element, such as an electronic valve and/or a pump.

In an exemplary embodiment of the invention, the flow velocity through proximity nozzle 23 is at least 10 meters per second, at least 8 meters per second, at least 2 meters per second, at least 4 meters per second, at least 6 meters per second or other smaller, intermediate or larger flow velocity.

A potential advantage of the described embodiment is providing a low frictional force between proximity nozzle 23 and filtration screen 26 that is substantially independent of the variation in suction force 103 and/or which allows for movement of proximity nozzle 23, if needed. A potential advantage of a low frictional force is low maintenance and/or repair requirements. A potential advantage of the use of bellows 24 instead of a spring and/or telescopic joint is that cleaning head 70 does not become clogged due to an accumulation of small particles. Another potential advantage of cleaning head 70 is that it does not have any seals which would suffer wear and/or tear due to friction.

Another potential advantage of some embodiments is that maintenance can be easy and/or can be accomplished by one person without special tools and/or lifting equipment. Optionally or alternatively, maintenance is made easy in that proximity nozzle 23 and/or bellows 24 can be removed in one piece and/or as separate parts. Optionally or alternatively, maintenance is made easy in that cleaning head 70 does not become clogged due to an accumulation of small particles. Optionally or alternatively, maintenance is made easy due to low wear and/or tear as a result of low friction forces. Optionally or alternatively, maintenance is made easy in that filtration system 102 requires less frequent cleaning cycles.

ALTERNATIVE EMBODIMENT

Figure 3:
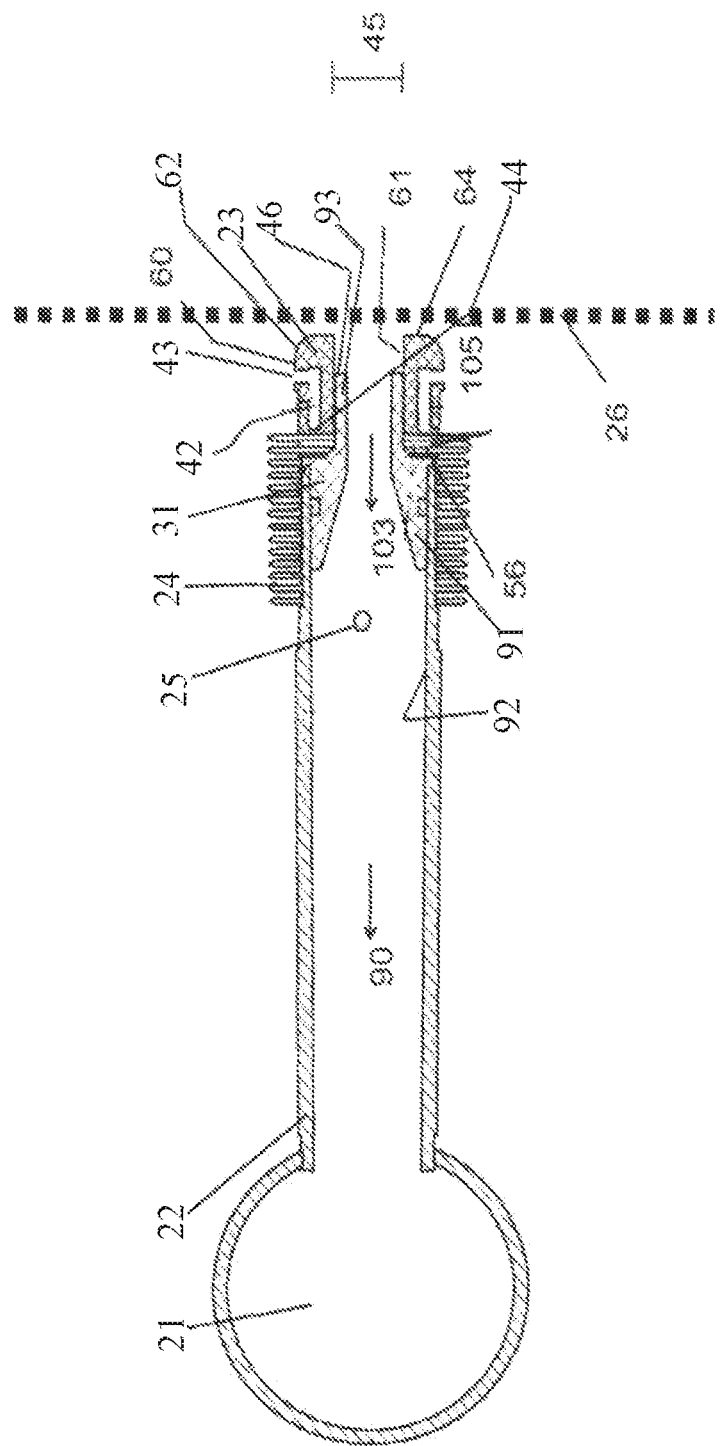
FIG. 3 is a cross sectional view of a cleaning head, in accordance with another embodiment of the invention.

FIG. 3 illustrates another embodiment of cleaning head 70, illustrating apertures used as pressure equalizers. Also illustrated is an option of a fitting between the pipe and/or the nozzle. Such features can be used with other embodiments described herein.

As shown in FIG. 3 pressure equalizer 42 is optionally embodied as a channel, for example, as an L shaped channel.

In an alternative embodiment, the channel is straight and/or slanted relative to the flow axis of proximity nozzle 23.

In the embodiment shown, an outer end of hole 43 can be located on an outer circumference 60 of proximity nozzle 23. An interior end of hole 44 can be located on an inner rim and/or in fluid communication with interior of bellows 56 and/or a gap 74 behind proximity nozzle 23.

As described above, pressure equalizer 42 can neutralize suction force 103 on bellows 24 and/or suction force 103 on proximity nozzle 23. Optionally pressure equalizer 42 equalizes the pressure in interior of bellows 56 and/or gap 74 with outside 105 by providing fluid communication. Outside 105 can be located close to filtration screen 26. Optionally or alternatively, outside 105 is located a distance of 0 mm, 0.2 mm, 1 mm, 3 mm, 5 mm or other smaller, intermediate or larger distance from filtration screen 26. In an exemplary embodiment of the invention, four holes 41 are provided. Alternatively, other numbers of holes are provided, for example, 2, 3, 5, 6 or other smaller, intermediate or larger numbers of holes. Optionally, holes 41 are equally spaced around outer circumference 60. Optionally, the holes are arranged so they cannot all be clogged at a same time by a single piece of debris. Optionally, the holes may be unclogged by providing increased forward (rather than reverse) pressure in pipe 21. Optionally, such unclogging is provided periodically and/or manually and/or automatically.

In an exemplary embodiment of the invention, the surface area of outer end of hole 43 ranges from about 1 mm.sup.2 to about 10 mm.sup.2, for example 2 mm.sup.2 to 5 mm.sup.2. The surface area of interior end of hole 44 ranges from about 1 mm.sup.2 to about 10 mm.sup.2, for example 2 mm.sup.2 to 5 mm.sup.2. Optionally, the holes have a substantially uniform cross-section. A total cross-section of surface area of outer end of hole 43 ranges between 0.1% and 20% of an area of proximity nozzle opening 45, for example 5% to 15%, for example 2% to 5%. A total cross-section of holes 43 ranges between about 60 mm.sup.2 to about 800 mm.sup.2, for example 200 mm.sup.2 to 500 mm.sup.2.

In an exemplary embodiment of the invention, cleaning head 70 includes an optional proximity nozzle insert 31, which is mounted on pipe 22 and/or guides the movement of proximity nozzle 23. In an exemplary embodiment of the invention, proximity nozzle insert 31 includes a wide end 91 which mounts on pipe 22 and to optionally includes a flange for attachment thereon and/or preventing backwards motion thereof. Optionally, the outer diameter of end 91 matches an inner diameter and fits flush against an inner surface 92 of pipe 22. Optionally, the pipe has a non-circular cross-section, which may assist in interlocking of insert 31 and pipe 22.

In an exemplary embodiment of the invention, a narrow neck section having a reduced diameter 93 of insert 31, has a diameter smaller than that of the inner diameter of a main lumen 61 of proximity nozzle 23. Optionally, the contact is flush, and friction is reduced by suitable selection of materials (e.g., proximity nozzle 23 and/or insert 31 being formed of for example, Techpack or Teflon).

In some designs, a space 46 can exist between thin diameter of proximity nozzle insert 93 and inner side of proximity nozzle 61. Optionally, proximity nozzle insert 31 separates the interior of bellows 56, gap 74 and/or holes 41 from a backflow of water 90. A potential advantage of separation is assisting pressure equalization by pressure equalizer 42 and/or the neutralization of suction force 103 on bellows 24 and/or proximity nozzle 23. Proximity nozzle insert 31 can provide for a smaller surface area of a proximity nozzle opening 45. A smaller surface area of proximity nozzle opening 45 can create a higher suction force 103 directed at filtration screen 26 that can result in a more efficient cleaning cycle. The surface of lumen 61 of proximity nozzle 23 can slide freely over thin diameter section 93 allowing for motion of proximity nozzle 23. Exemplary dimensions of proximity nozzle opening 45 diameters may be 2 mm, 5 mm, 10 mm, 15 mm, or other smaller, intermediate or larger diameters. Exemplary dimensions of outer circumference 60 diameter of proximity nozzle 23 may be 10 mm, 25 mm, 32 mm, 35 mm or other smaller, intermediate or larger diameters. Proximity nozzle insert 31 can be made from a durable material that provides low frictional forces, for example Techpack or Teflon.

Proximity nozzle 23 can be annular in shape and/or can also comprise a rounded edge 62. Optionally proximity nozzle 23 is made out of a durable material, for example Techpack or Teflon that also provides a low frictional force against filtration screen 26.

Proximity nozzle 23 can be connected to bellows 24 using various connection schemes, for example, using a split pin (not shown), and/or other methods. Additional alternative connection methods include gluing, welding and/or pinning The total cross-sectional diameter of proximity nozzle opening 45 may range between 0.1% and 20% relative to the surface area of filtration screen 26, or for example 5% to 15%, for example 2% to 5, or be at a smaller or larger relative size. Typically, having a small cross-sectional area concentrates backflow water 90, resulting in a high velocity flow, higher pressures and/or a resulting higher removal rate of suspended solids and/or organic suspended matter in particular from filtration screen 26. Optionally, proximity nozzle opening 45 is made small enough in cross-section so that all areas being cleaned achieve a sufficient backflow pressure.

Bellows 24 can be connected to pipe 22 with a split pin 25, and/or using another connection method, such as gluing, and/or welding.

The long axis of pipe 22 can be about perpendicular to a tangent of a cross section of suction pipe collector 21. Exemplary dimensions of external diameter of pipe 22 may be 10 mm, 15 mm, 20 mm, 25 mm, 30 mm, 35 mm or other smaller, intermediate or larger diameters. Exemplary dimensions of internal diameter of pipe 22 may be 10 mm, 15 mm, 20 mm, 21 mm, 25 mm, 30 mm, 35 mm or other smaller, intermediate or larger diameters. Pipe 22 is optionally made out of a durable and/or rigid material, for example stainless steel, steel and/or plastic.

Alternative Equalizer Design

Figure 4:
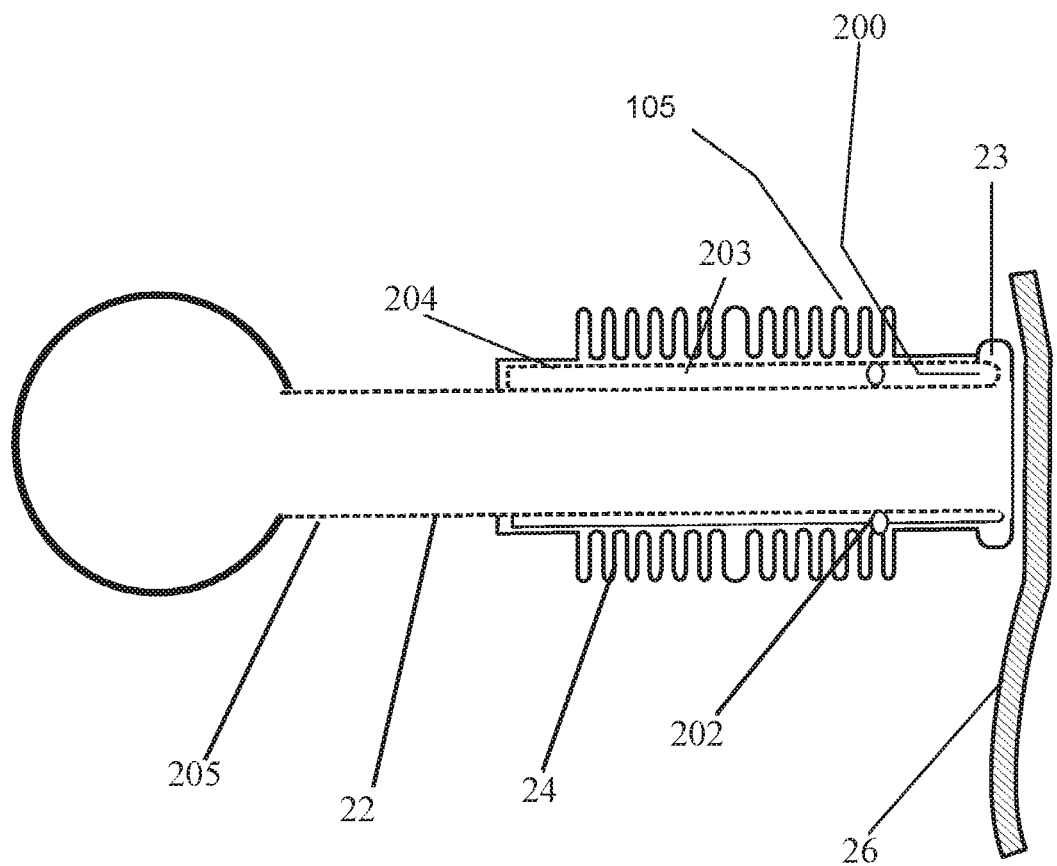
FIG. 4 is a cross sectional view of a cleaning head, in accordance with another embodiment of the invention.

FIG. 4 illustrates another embodiment of cleaning head 70, illustrating use of a different location for pressure-equalization apertures. As shown, pressure equalizer 42 can be formed by a hollow space in nozzle 200 in fluid communication with a hollow space in bellows 24 (optionally including a spacing 203 between the bellows and pipe 22 for example 0.1 mm, 0.3 mm, 0.5 mm, 1.0 mm, 1.5 mm, 2.0 mm or other smaller, intermediate or larger spacing) and open to an outside 105 through one or more bellows hole 202. Optionally, bellows 204 is isolated from space 200, which is optionally served by its own pressure equalizer. Optionally, different parts of the nozzle assembly have different pressure equalizers associated therewith.

In an exemplary embodiment of the invention, 1, 3, 4, 5, 7, 10 or other smaller, larger, or intermediate numbers of bellows holes 202 are provided. Optionally, a portion of bellows 24 is made porous, for example, by a fabric and/or mesh coating. Optionally, holes 202 are arranged to prevent multiple blockages thereof. Optionally or to alternatively, holes 202 are arranged along the length and/or circumference of bellows 24. Optionally or alternatively, holes 202 are arranged near a location of fluid communication of bellows 24 with backflow 90. In an exemplary embodiment of the invention, holes 202 are arranged so as not to interfere with a nozzle approximating function of bellows 24.

Exemplary Pressure Equalizer Parameters

In some exemplary embodiments, pressure equalizer 42 reduces 100% of the pressure difference between interior of bellows 56 and/or gap 74 and outside 105. Optionally or alternatively, pressure equalizer 42 reduces the pressure difference between interior of bellows 56 and/or gap 74 and outside 105 by a range of about 100-50%, for example 90%, 80%, 70%, 50% or other smaller, intermediate or larger pressure differences.

In some embodiments, pressure equalizer 42 can be located on an outer circumference 60 of proximity nozzle 23 where it can be on a plane perpendicular to suction force 103.

In some embodiments, pressure equalizer 42 can comprise a valve, for example, a flap valve.

In an embodiment, pressure equalizer 42 includes a microelectromechanical system (MEMS), including, for example, one or more of valves, pumps, pressure detectors, pressure equalizers, pressure controllers, electrical control circuitry and/or any other devices and/or components arranged to equalize and/or control pressures.

In some embodiments, pressure equalizer 42 can be configured to equalize pressures between any two and/or more areas such that suction force 103 on bellow 24 and/or suction force 103 on proximity nozzle 23 are neutralized.

In some embodiments pressure equalizer 42 can create a positive pressure gradient to position proximity nozzle 23 on filtration screen 26 with a minimal frictional force by increasing the size of gap 74 behind proximity nozzle 23 and/or decreasing the surface area of proximity nozzle face 64.

Bellows

Figure 5:
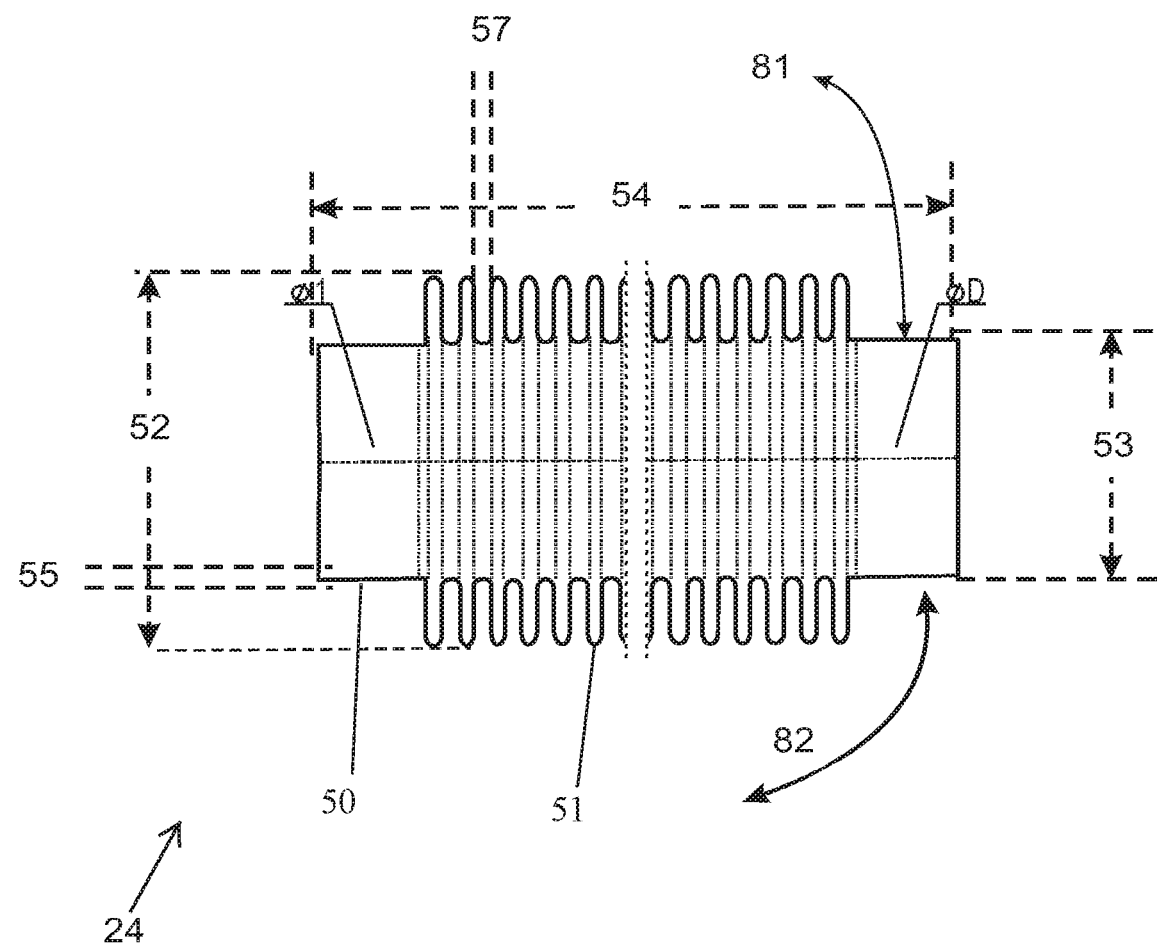
FIG. 5 is a cross sectional view of a bellows, in accordance with an embodiment of the invention.

FIG. 5 illustrates an exemplary embodiment of bellows 24. Bellows 24 can be comprised of a thin tube 50 with corrugations 51. Dimensions of bellows 24 can be, for example, an external diameter 52 ranging about 25 to 50 mm, or 27 mm, 35 mm, 45 mm or other smaller, intermediate or larger external diameter. An internal diameter 53 of bellows 24 can range about 5 to 8 mm less than external diameter 52, or 6 mm or 7 mm less. A length 54 of bellows 24 can range about 30 to 80 mm, for example 40 mm, 50 mm, 60 mm, or other smaller, intermediate or larger length. Number of corrugations 51 can range from about 10 to 25, for example 15 corrugations or 20 corrugations or other smaller, intermediate or larger numbers of corrugations. Thickness 55 of the material can range from about 1 mm to 1.5 mm, for example 1.1 mm, 1.3 mm or other smaller, intermediate or larger thickness.

Optionally the dimensions provide a spring tension force of about 100-800 grams per millimeter, for example 150 grams/mm, 250 grams/mm, 300 grams/mm, 500 grams/mm or other smaller, intermediate or larger spring tension force, for a spring extension of, for example, between 1 and 5 mm, for example 2-3 mm. Optionally corrugations 51 provide for proximal and/or distal movements. If spaces 57 in between corrugations 51 are increased equally around outer circumference of bellows 24, then length 54 of bellows 24 can be increased. If spaces 57 in between corrugations 51 are decreased equally around the circumference of bellows 24, then length 54 can be decreased. Optionally bellows 24 can be made out of a stainless steel (SST) material for long life and/or durability.

In some embodiments, one end of bellows 24 can tilt, for example, in any direction as illustrated by a direction arrows 81 82. Tilting can occur by an unequal increase in spaces 57 in between corrugations 51 around the circumference. As an example, if spaces 57 between corrugations 51 are increased at the bottom part of bellows 24, while at the same time spaces 57 in between corrugations 51 are decreased at the top part of bellows 24, the effect can be to tilt proximity nozzle 23 up, according to direction arrow 81. In another embodiment, tilting force is provided by resistance of filtration screen 26, which bellows 24 optionally accommodates.

Proximity nozzle 23 can be attached to the end of bellows 24, providing for the to tilting of proximity nozzle 23. A potential advantage of a tilt is allowing proximity nozzle 23 to adjust to surface variations of filtration screen 26, such as may occur if there is an excessive local accumulation of waste material, if filtration screen 26 has local indentations and/or due to the geometry of filtration screen 26. The tilting ability of bellows 24 can provide a smoother movement of proximity nozzle 23 with respect to filtration screen 26 thereby reducing the amount of friction and/or providing the closest possible proximity to filtration screen 26 without applying additional forces to filtration screen 26. In an exemplary embodiment of the invention, a proximity nozzle face 64 can touch filtration screen 26 at a perpendicular angle. Optionally, a proximity nozzle face 64 can touch filtration screen 26 at angles relative to a perpendicular angle, for example −10 degrees, −7 degrees, −5 degrees, −3 degrees, 0 degrees, +3 degrees, +5 degrees, +7 degrees, +10 degrees, or other smaller, intermediate or larger angles, such as 20 degrees or more.

In some embodiments corrugations 51 can be hollow inside and in continuity with interior of bellows 56.

In some embodiments corrugations 51 are not hollow inside, for example, having foam therein.

In some embodiments bellows 24 with a spring-like function can be replaced by a bellows lacking a spring-like function, the spring-like function being provided by an attached and/or embedded spring.

In some embodiments bellows 24 is replaced by any resilient element and/or any deformable housing.

In some embodiments bellows 24 is replaced by a deformable tube (e.g., compliant and/or elastic) and/or a spring.

Exemplary Method of Operation

Figure 6:
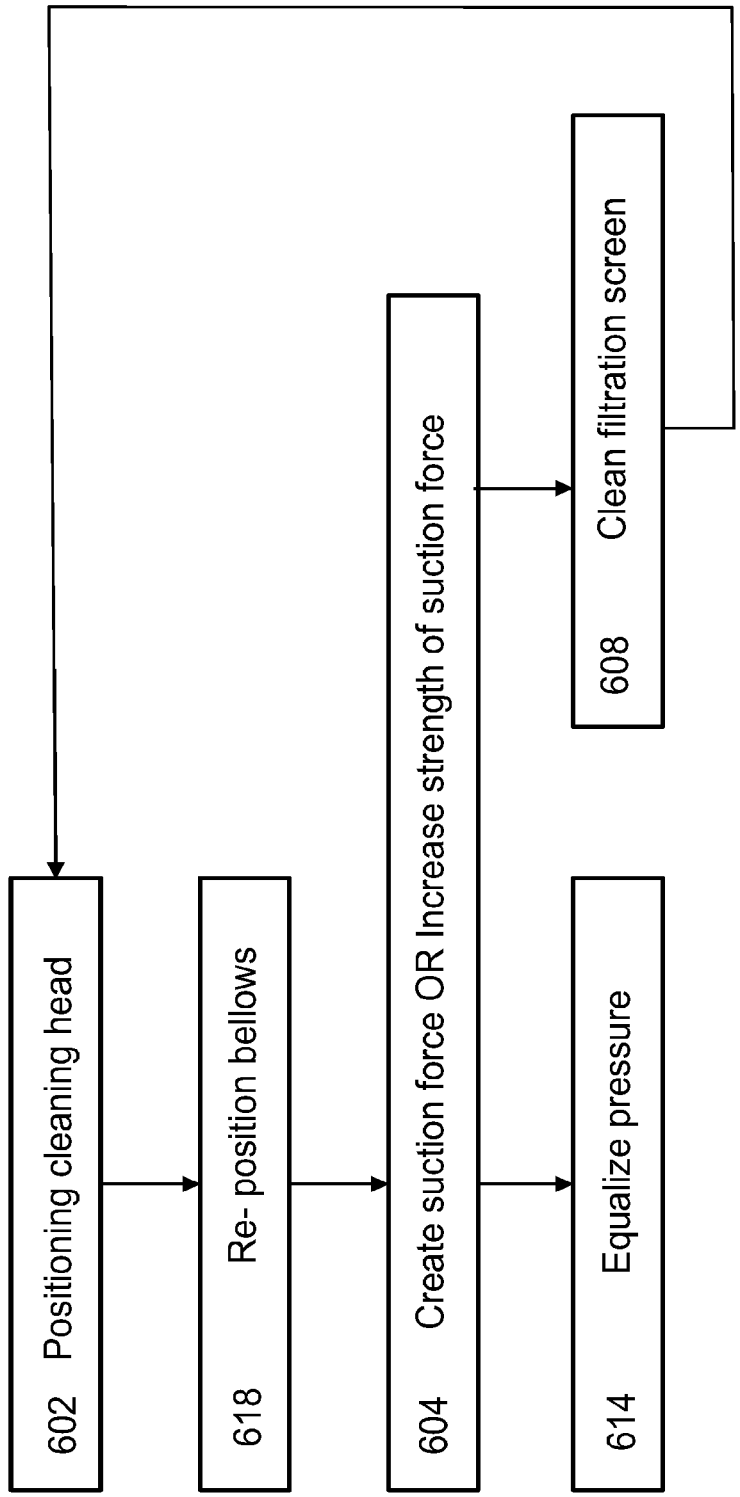
FIG. 6 is a flowchart of a method of cleaning while also contacting the filtration screen by a cleaning head with a low force during a cleaning cycle, in accordance with an embodiment of the invention.

FIG. 6 is a flowchart of a method of cleaning while also contacting the filtration screen by a cleaning head with a low force during a cleaning cycle, in accordance with an embodiment of the invention. The method will be explained with references to FIG. 7.

Figure 7:
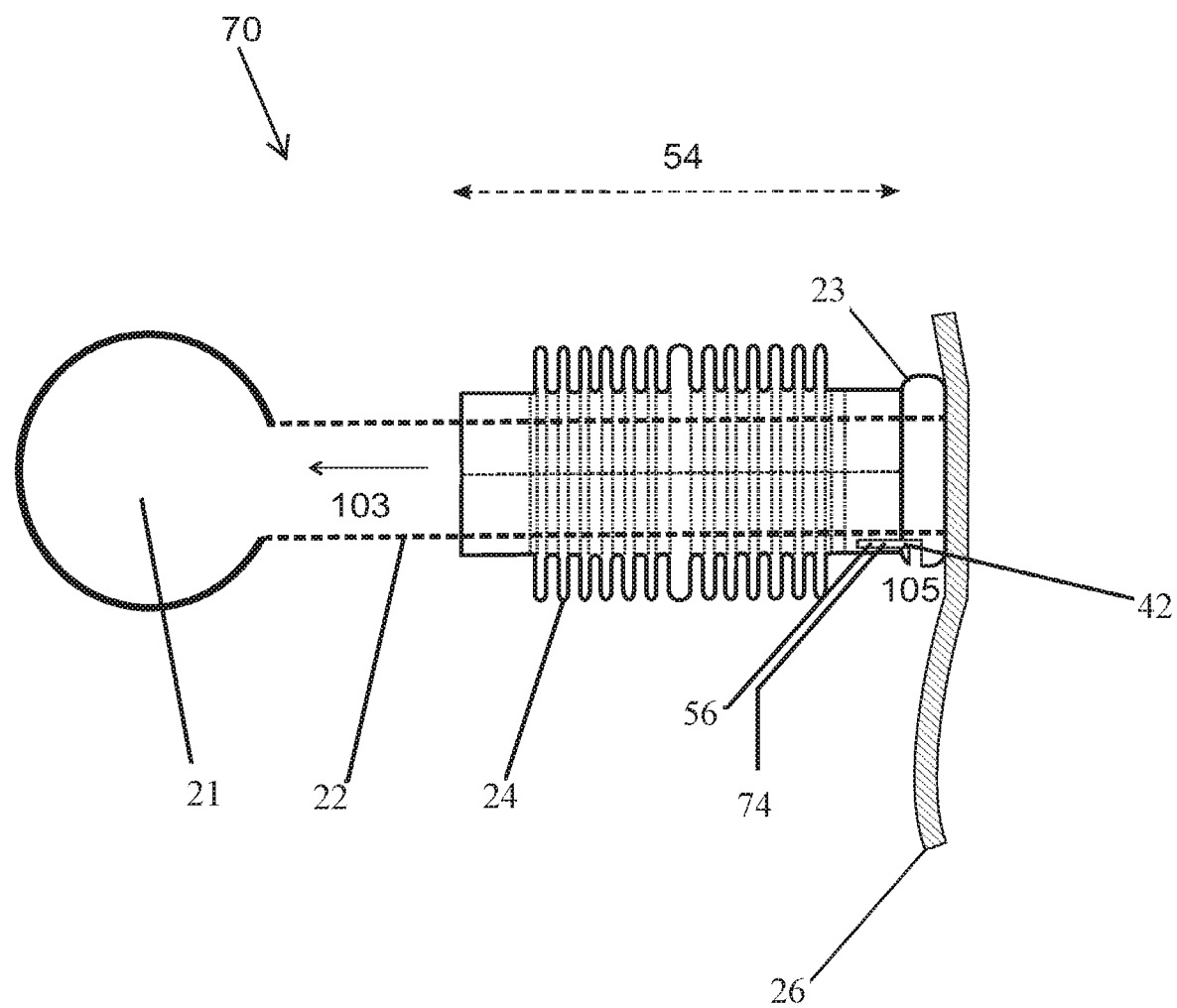
FIG. 7 is a cross sectional view of a cleaning head touching the filtration screen with a low force, in accordance with an embodiment of the invention.

FIG. 7 is optionally an initial configuration of the position of cleaning head to 70. Optionally bellows 24 is adjusted to push proximity nozzle 23 such that it touches filtration screen 26 with a very low force, the contact force ranging from about 100 gram to about 300 gram, for example 150 gram, 250 gram, or other smaller, intermediate or larger forces. Optionally, the forces remain substantially constant (e.g., within a factor of 2, over a range of negative flow pressures in pipe 22 over a range of 1:2, 1:4, 1:10 or other smaller or intermediate ranges of pressures.

At 602, cleaning head 70 is positioned in the initial configuration, for example as shown in FIG. 7.

At 618, the force exerted by the built in spring-like tension force of bellows 24 optionally pushes proximity nozzle 23 towards the surface of filtration screen 26.

At 604, the connection of suction pipe collector 21 to a pressure sink creates suction force 103 in pipe 22. For example, as illustrated in FIG. 1, flush valve 7 can be opened such that suction pipe collector 21 is connected to the atmosphere. Optionally, suction force 103 can vary in strength throughout the cleaning cycle and/or can vary in strength between individual cleaning cycles. Optionally, an existing suction force 103 increases in strength.

At 608, suction force 103 causes reverse flow through filtration screen 26 and removes debris and/or waste from filtration screen 26.

Optionally as cleaning head 70 is moved along surface of filtration screen 26, cleaning head 70 is re-positioned as in 602.

At 614, an equalization and/or reduction of pressure is optionally provided between outside 105 and gap 74 behind proximity nozzle 23 and/or an interior of bellows 56 as a result of sufficient fluid flow. The neutralization of suction force 103 on proximity nozzle 23 and/or suction force 103 on bellows 24 is optionally provided by an equalization of pressures. Suction force 103 forms a negative pressure in gap 74 behind proximity nozzle 23 and/or an interior of bellows 56. The pressure differential causes fluid flow from outside 105 through apertures of pressure equalizer 42 to gap 74 behind proximity nozzle 23 and/or an interior of bellows 56. Pressure equalizer 42 can allow sufficient fluid flow in and out of interior of bellows 56 and/or interior of proximity nozzle 74 from outside 105, for example 5 liters per hour, 10 liters per hour, 15 liters per hour, or other smaller, intermediate or flow rates.

The neutralization of suction force 103 by pressure equalizer 42 as described at to 614 can occur gradually as the suction force 103 is built up from zero, and/or as suction force 103 varies throughout the cleaning cycle. A potential advantage of pressure equalizer 42 is the capability of handling variable suction forces 103. The re-expansion of bellows 24 as in step 618 optionally occurs at about the same time as the neutralization of suction force 103 on proximity nozzle 23 and/or the neutralization of suction force 103 on bellows 24. In effect 602, 618, 604, 614, optionally occur about simultaneously, resulting in proximity nozzle 23 remaining mostly touching filtration screen 26 while cleaning filtration screen 26. Furthermore, even if suction force 103 varies throughout the cleaning cycle, 602, 618, 604, 614, 608 optionally operate substantially simultaneously to maintain mostly contact between proximity nozzle 23 and filtration screen 26.

Referring back to 618, the neutralization of variable suction force 103 can result in that the amount of force required to push proximity nozzle 23 towards filtration screen 26 is about the same as if there were no suction force 103, which is about the same as in the initial configuration. The resulting configuration is the same as the initial configuration in which bellows 24 is adjusted to push proximity nozzle 23 all the way such that proximity nozzle 23 can touch filtration screen 26 with a low force. Optionally the force required to push proximity nozzle 23 to filtration screen 26 is maintained over a range of pressure differentials between inside of pipe 22 and outside 105 of about 0 bar to 25 bar, for example 3 bar, 5 bar, 10 bar, 15 bar, 23 bar or other smaller, intermediate or larger pressure differentials.

In an embodiment an initial configuration of the position of cleaning head 70 can be such that bellows 24 is adjusted to push proximity nozzle 23 such that it comes to within about 0 mm from filtration screen 26. Optionally proximity nozzle 23 can move proximally and/or distally a range of about −2 mm to about +4 mm relative to the initial configuration. Optionally negative distal motion of proximity nozzle 23 may occur by a contraction of bellows 24. Optionally or alternatively, negative distal motion of proximity nozzle 23 may occur due to pressure on nozzle 23, for example if filtration screen 26 is distorted, if alignment of motion mechanism is offset, and/or if pipe 22 is suddenly pushed against filtration screen 26.

Optionally the combination of bellows 24 with a pressure equalizer 42 results in the ability to clean filtration screen 26 even under low pressure conditions across to filtration screen 26 of, for example, 1.5 bar or less.

Optionally the ability to clean filtration screen 26 even under low pressure conditions across filtration screen 26 results in a lower use of flush water for cleaning and consequently a lower percentage of wasted water.

Optionally filtration system 102 has the ability to operate in continuous flushing mode.

In an exemplary embodiment of the invention, during normal operation mode, filtration system 102 uses about 0.1%, 0.5%, 1%, 2%, 3% or other smaller, intermediate or larger percentage of the flow for flushing.

In an exemplary embodiment of the invention, during continuous flush mode, filtration system 102 uses about 1%, 5%, 7%, 10%, 13% or other smaller, intermediate or larger percentage of the flow for flushing.

The function and/or structure of a single cleaning head 70 has been discussed for illustrative purposes only. A plurality of heads, of same and/or different designs may be provided in a filtering system, for example, the number of cleaning heads 70 vary depending on the size and/or application of filtration system 102. Optionally, other numbers of cleaning heads 70 are provided, for example, 1, 5, 10, 15, 20 or other smaller, intermediate or larger numbers of cleaning heads 70.

The above description uses the filtration of ballast water only as an example. The apparatus described herein can be adapted for other applications such as irrigation systems, water desalination systems, and/or water purification systems. Furthermore, applications are not limited to the filtering of water. Filtration screen 26 that is used to filter any liquid, for example oil, may be a part of a filtration system that can be cleaned using the described embodiments. As an example, a filtration system for the filtration of sea water could require the use of corrosive resistant materials. As another example, a filtration system for the filtration of oil could typically use smaller cleaning heads 70.

General

It is expected that during the life of a patent maturing from this application many relevant filtering screens will be developed and the scope of the term filtering screen is intended to include all such new technologies a priori.

As used herein the term "about" refers to .+−0.10%

The terms "comprises", "comprising", "includes", "including", "having" and to their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various to embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A filter cleaning system comprising:
    a suction pipe collector for connection to a source of suction;
    a pipe having a first end attached to said suction pipe collector; and
    a cleaning head including:
        a retractable proximity nozzle;
        a proximity nozzle insert having a wide end which is sealingly mounted on a second end of said pipe and a narrow end that slidably and guidingly engages said retractable proximity nozzle, facilitating relative longitudinal movement away from and towards the second end of said pipe;
        a pressure-equalizing channel extending through said retractable proximity nozzle for placement of an interior of said pipe in fluid communication with an exterior of said pipe; and
        a bellows coupling said retractable proximity nozzle to said pipe, and resiliently urging said proximity nozzle toward a filter screen,
        wherein application of suction to said suction pipe collector will cause accumulated debris to be removed from said filter screen through said cleaning head and pipe, while the pressure-equalizing channel reduces or eliminates pressure-related forces acting to retract said nozzle.

* * * * *